(12) United States Patent
Mouhouche

(10) Patent No.: US 8,463,196 B2
(45) Date of Patent: Jun. 11, 2013

(54) METHOD AND DECODER FOR DECODING A WIRELESS TRANSMISSION FROM A PREDEFINED USER

(75) Inventor: Belkacem Mouhouche, Fonsorbes (FR)

(73) Assignee: Freescale Semiconductor, Inc., Austin, TX (US)

( * ) Notice: Subject to any disclaimer, the term of this patent is extended or adjusted under 35 U.S.C. 154(b) by 638 days.

(21) Appl. No.: 12/671,226

(22) PCT Filed: Aug. 9, 2007

(86) PCT No.: PCT/IB2007/054861
§ 371 (c)(1),
(2), (4) Date: Jan. 29, 2010

(87) PCT Pub. No.: WO2009/019540
PCT Pub. Date: Feb. 12, 2009

(65) Prior Publication Data
US 2010/0203840 A1    Aug. 12, 2010

(51) Int. Cl.
*H04B 1/00* (2006.01)
(52) U.S. Cl.
USPC ......... 455/67.13; 375/136; 375/142; 375/143
(58) Field of Classification Search
USPC .............. 455/67.13, 63.1; 375/150, 136, 142, 375/143, 144, 148, 152, 260, 348
See application file for complete search history.

(56) References Cited

U.S. PATENT DOCUMENTS 6,956,893 B2   10/2005  Frank et al.
8,199,793 B2 *  6/2012  Bastuğ et al. ................. 375/150

FOREIGN PATENT DOCUMENTS

| WO | 2005/027367 A1 | 3/2005 |
| WO | 2005/109708 A | 11/2005 |
| WO | 2006/059088 A | 6/2006 |
| WO | 2007/066283 A | 6/2007 |
| WO | WO 2007066283 A1 * | 6/2007 |

OTHER PUBLICATIONS

Moshavi S: "Multi-User Detection for DS-CDMA Communications" IEEE Communications Magazine, IEEE Service Center, New York, NY, US, vol. 34, No. 10, Oct. 1996, pp. 124-136.
Mouhouche B: Method for Quasi-Wiener Detection of MultiCode Mutirate CDMA and a Corresponding Receiver, WMSG, Freescale Semiconductor, Inc. 2006, Presentation, pp. 1-4.
International Search Report and Written Opinion correlating to PCT/IB2007/054861 dated May 8, 2008.

* cited by examiner

*Primary Examiner* — April G Gonzales

(57) ABSTRACT

A method of decoding in a wireless receiver, a wireless transmission from a predefined user, the method comprising: receiving a wireless transmission signal (r(m)); determining a one or more interfering spreading codes ($s_i(m)$) contributing to the received wireless transmission signal (r(m)); estimating a one or more interferer symbols ($\hat{b}_i(m)$) from the received wireless transmission signal (r(m)) and the or each interfering spreading codes ($s_i(m)$); calculating a one or more scaling factors (Pi(m)) at which the or each of the interferer symbols ($\hat{b}_i(m)$) was originally transmitted; simulating an interference signal i(m) in the received wireless transmission signal (r(m)); removing the simulated interference signal i(m) from the received wireless transmission signal (r(m)) to produce a processed wireless signal (o(m)); and estimating a one or more symbols $\hat{b}(m)$ transmitted by the predefined user in the processed wireless signal (o(m)).

20 Claims, 5 Drawing Sheets

METHOD AND DECODER FOR DECODING A WIRELESS TRANSMISSION FROM A PREDEFINED USER

FIELD OF THE INVENTION

The invention relates to a method and decoder for decoding a wireless transmission from a predefined user, the method and decoder being used particularly, but not exclusively in a wireless receiver.

BACKGROUND OF THE INVENTION

Code Division Multiple Access (CDMA) separates signals from different users with unique code sequences, so that the users can transmit simultaneously using the same frequency. On receipt of a signal, a wireless receiver multiplies the signal with a dispreading waveform to recover a transmitted data sequence. However, data recovery is only possible if the code sequence of the received signal is synchronised with the dispreading waveform.

Wideband Code Division Multiple Access (WCDMA) uses orthogonal spreading codes followed by non-orthogonal pseudo-random scrambling codes. Orthogonal Variable Spreading Factor (OVSF) codes are used in Universal Mobile Telecommunication System (UMTS) and High-Speed Downlink Packet Access (HSDPA) protocols. In the HSDPA mode of UMTS, a user is allocated more than one OVSF code.

In a single path propagation channel, simple dispreading can recover symbols transmitted by a user, since other OVSF codes are orthogonal thereto. However, in multi-path propagation channels, a signal received by a wireless receiver is a superposition of scaled and shifted copies of the originally transmitted signal. Thus, it is difficult to prevent the spreading codes assigned to different users from interfering with each other. More particularly, if a received signal only comprised the codes of a given user, the wireless receiver could use joint detection algorithms to estimate the transmitted symbols. However, when a signal comprises codes from multiple users, a wireless receiver must decipher a communication from a user, being aware only of the codes uniquely allocated to that user (i.e. unaware of the other codes).

International Patent Application WO2005/109708 describes a method for determining spreading codes. However, the spreading codes detected in WO2005/109708 are not the actual spreading codes. Instead, they are virtual codes and the interference reconstructed there from is not an exact interference but an approximation of the projection of the interference on the virtual codes. U.S. Pat. No. 6,956,893 describes a parallel interference cancellation technique. However, the technique does not provide for OVSF symbol detection, since it uses single length spreading parent codes instead of actual child codes. Furthermore, the technique does not use joint detection, since it is designed for single code CDMA.

SUMMARY OF THE INVENTION

According to the invention there is provided a method and decoder for decoding, in a wireless receiver, a transmission from a predefined user as claimed in the appended claims.

BRIEF DESCRIPTION OF THE DRAWINGS

An embodiment of the invention will now be described, by way of example only, with reference to the accompanying Figures in which.

DETAILED DESCRIPTION OF THE PREFERRED EMBODIMENTS

A. Orthogonal Variable Spreading Factor (OVSF) Codes and the General Dispreading Problem OVSF codes are formed from an OVSF tree, wherein all codes at a given spreading factor are orthogonal to each other. A first layer of an OVSF tree can be generated from a single parent code C1, by repeating and concatenating the parent code (i.e. to produce [C1 C1]). This process can be repeated (by concatenating and alternating the signs of the elements from the first layer code) to produce two second layer codes [C1 C1 C1 C1] and [C1 C1 −C1 −C1]. This process is essentially repeated for each successive layer of the code tree. For example, taking four OVSF codes C(1,4)=[1 1 1 1]; C(2,4)=[1 1 −1 −1]; C(3,4)=[1 −1 1 −1]; and C(4,4)=[1 −1 −1 1], a first code of length eight can be given by C(1,8)=[C(1,4) C(1,4)] =[1 1 1 1 1 1 1 1]. Similarly, a second code of length eight can be given by C(2,8)=[C(1,4)−C(1,4)]=[1 1 1 1 −1 −1 −1 −1]. A physical channel may use a certain code in the tree; if no other physical channel to be transmitted using the same code tree uses a code that is on an underlying branch (i.e. using a higher spreading factor code generated from the intended spreading code to be used). Neither can a smaller spreading factor code on the path to the root of the tree be used.

If a code C1 is present in an incoming signal, dispreading the incoming signal with child-codes [C1 C1] and [C1 C1] causes each of the child codes to be detected approximately half of the time. This occurs because the transmission of two consecutive identical symbols b1 (+1 or −1) corresponds to transmission of [b1 C1 b1 C1]=b1 [C1 C1]. This is equivalent to the transmission of a "virtual code" [C1 C1]. On the other hand, if two consecutive symbols b1 and −b1 are transmitted (wherein −b1 is the opposite of b1 (i.e. is −1 or +1)), it would correspond to the transmission of [b1 C1 −b1 C1]=b1 [C1 −C1]. This is equivalent to the transmission of a virtual code [C1 −C1]. Thus, if a code C1 is used by a transmitter to spread symbols, the two child codes deriving from it, namely [C1 C1] and [C1 −C1], are detected by a receiver around 50% of the time.

B. Overview of the Receiver of the Preferred Embodiment

Figure 1:
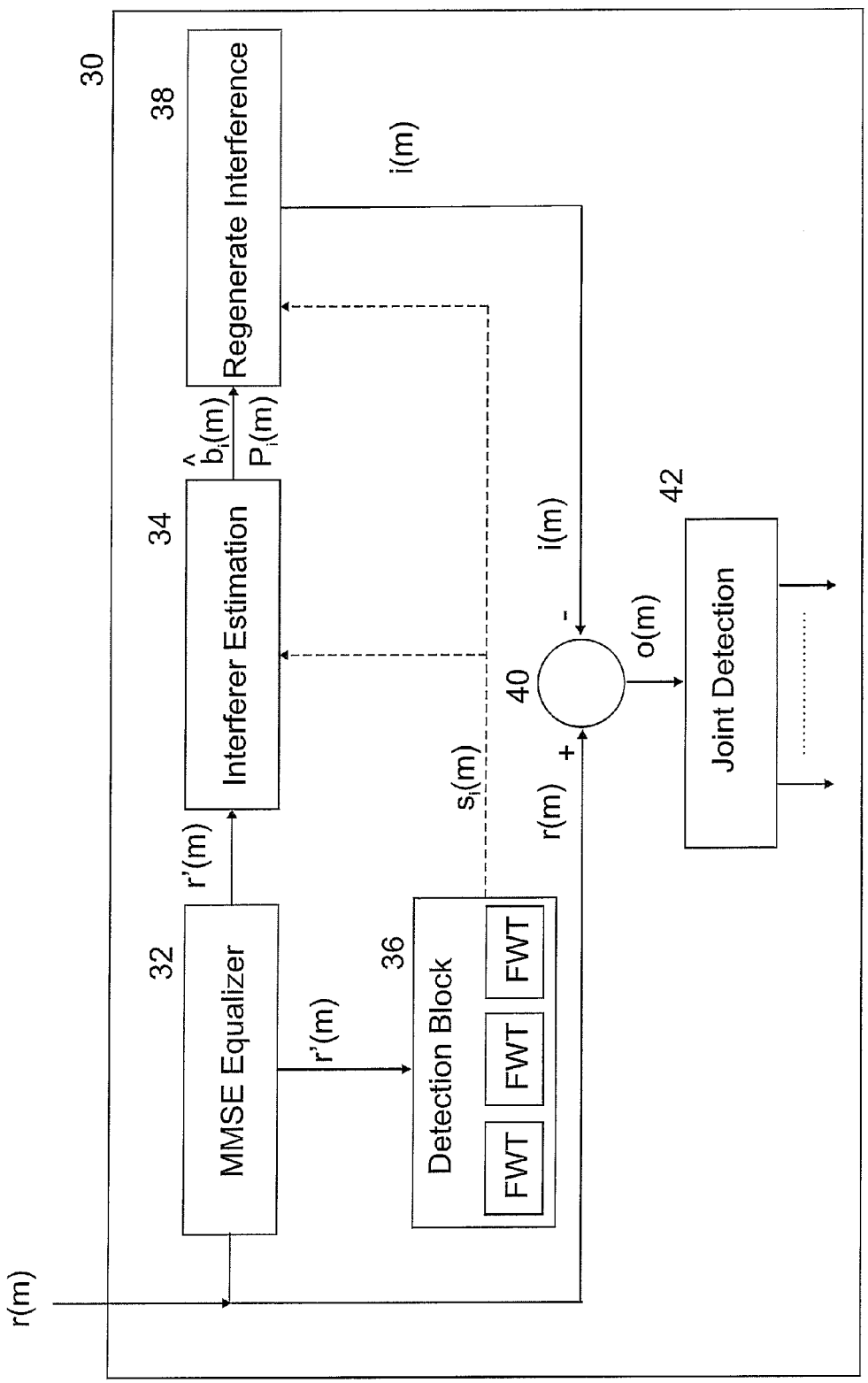
FIG. 1 is a block diagram of a receiver of a preferred embodiment.
Figure 2:
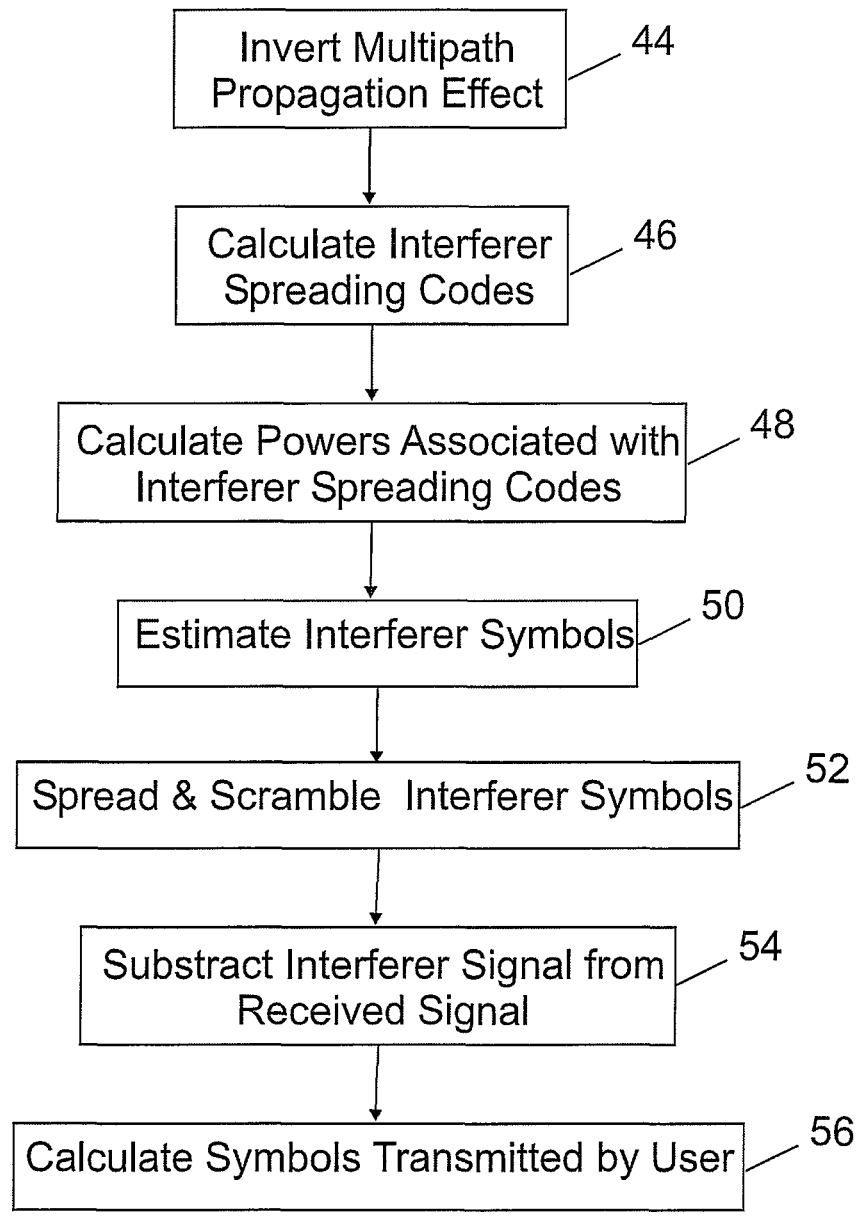
FIG. 2 is a flow chart of a method of the preferred embodiment.

Referring to FIGS. 1 and 2, a receiver 30 of the preferred embodiment comprises a Minimum Mean Squared Error (MMSE) equalizer 32, an interferer estimation block 34, a detection block 36, a regeneration block 38, an adder 40 and a joint detection block 42. In use, an incoming signal r(m) to the receiver 30 at time m, is transmitted to the MMSE equalizer 32 which inverts 44 the effect of the propagation channel on the signal. More particularly, the MMSE equalizer 32 restores the orthogonality between spreading codes lost because of multipath propagation. The output of the MMSE equalizer 32 (i.e. equalized incoming signal r'(m)) is transmitted to the detection block 36, which determines 46, 48 interfering spreading codes ($s_i$(m), where I=1 to N; and N is the number of interferers) in the incoming signal.

The equalized received signal (r'(m)) and the interfering spreading codes ($s_i$(m)) are also transmitted to the interferer estimation block 34, which uses this information to estimate 50 a one or more interferer symbols $\hat{b}_i$(m) and the powers $P_i$(m) associated therewith. The interferer symbols $\hat{b}_i$(m) are then spread and scrambled by the regeneration block 38 (using the powers $P_i$(m)) to simulate (or regenerate) 52 an interference signal (i(m)). The interference signal (i(m), is then subtracted 54 (by the adder block 40) from the originally received signal (r(m)) to produce an interference-free signal (o(m)). The interference-free signal (o(m)) is transmitted to the joint detection algorithm 42, where it is used to calculate 56 the symbols originally transmitted by the user of interest.

C. Detailed Description of the Method of the Preferred Embodiment

There are four categories of spreading codes, namely:
1. spreading codes used by the user of interest;
2. interfering spreading codes used by other users but known by the user of interest (e.g. spreading codes of control channels);
3. interfering spreading codes used by other users and not known by the user of interest; and
4. unused spreading codes.

Figure 3:
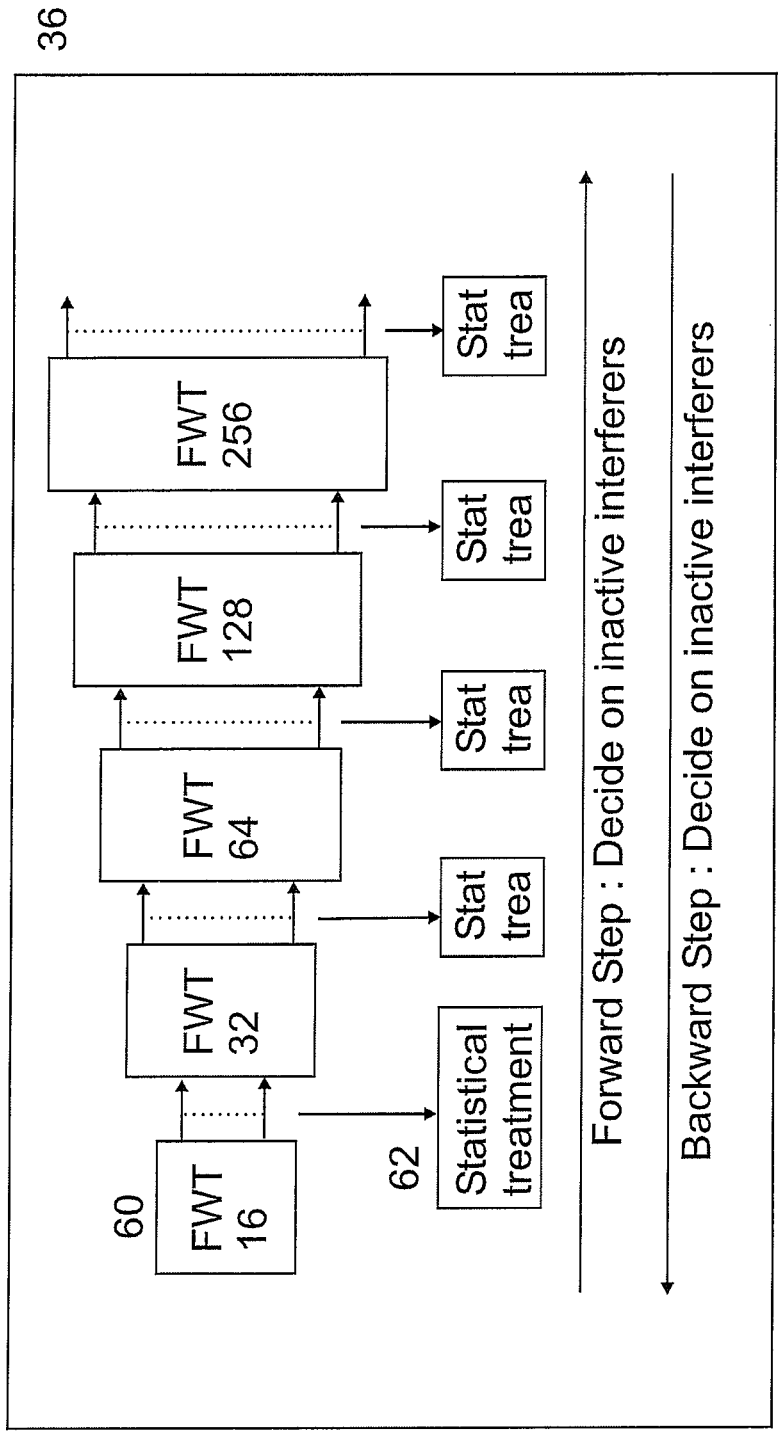
FIG. 3 is a block diagram of the operations of a detection block in the receiver shown in FIG. 1.

The purpose of the detection block 36 is to detect interfering spreading codes used by other users but known by the user of interest; and unused spreading codes. In a simple dispreading approach, N multiplications are needed to dispread a signal using one spreading code of length N; and $N^2$ multiplications are required to dispread all possible N spreading codes of length N. In contrast, a Fast Walsh transform (FWT) of length N only requires $N \cdot \log_2 N$ multiplication to provide dispread symbols for all possible N spreading codes. Thus, for example, if N=256, all the symbols can be dispread with an FWT using 256×$\log_2$ 256 (2048) multiplications instead of the 256×256 (65536) multiplication operations required in simple dispreading. Referring to FIG. 3, the detection block 36 in the preferred embodiment comprises a plurality of length N FWT calculating modules. Each length N FWT calculating module has N outputs (corresponding to dispreading using all N possible spreading codes of length N). The presence of codes at an output of a length N FWT calculating module, is detected by comparing the energy at the output with a threshold value. Statistical treatment blocks 62 (connected to the outputs of the FWT calculating modules) calculate the percentage of occurrence (at the FWT calculating module output) of each of the possible codes.

Figure 4:
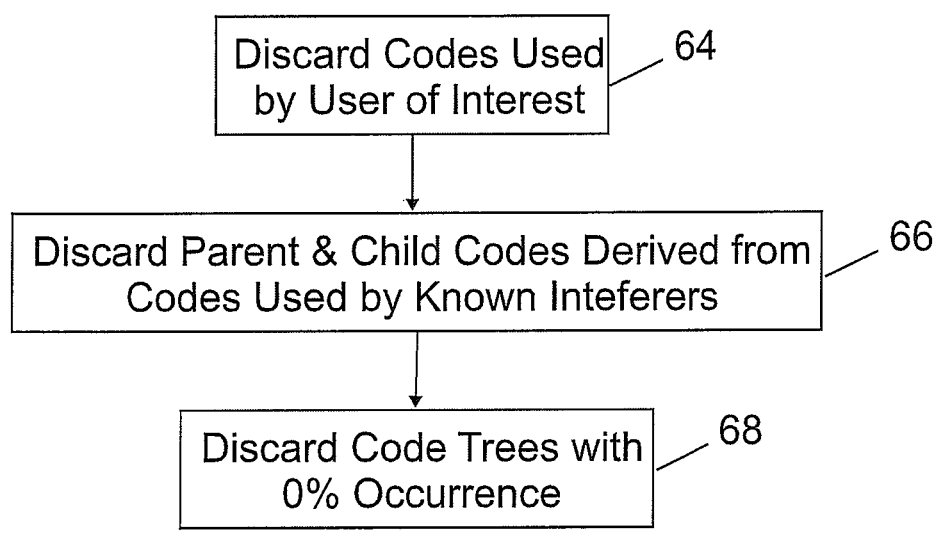
FIG. 4 is a flowchart of a forward phase of an algorithm performed by the detection block in the receiver shown in FIG. 1.

The detection block 36 and interferer estimation block 34 implements an algorithm comprising a forward and backward phase, wherein (referring to FIG. 4), the forward phase comprises the steps of:
 discarding 64 codes used by the user of interest (since they do not represent interferer signals) from the list of all possible spreading codes;
 discarding 66 all parent codes and child codes derived from codes used by users that are known to the user of interest; and
 discarding 68 code trees whose percentage of occurrence is close to 0%.

Figure 5:
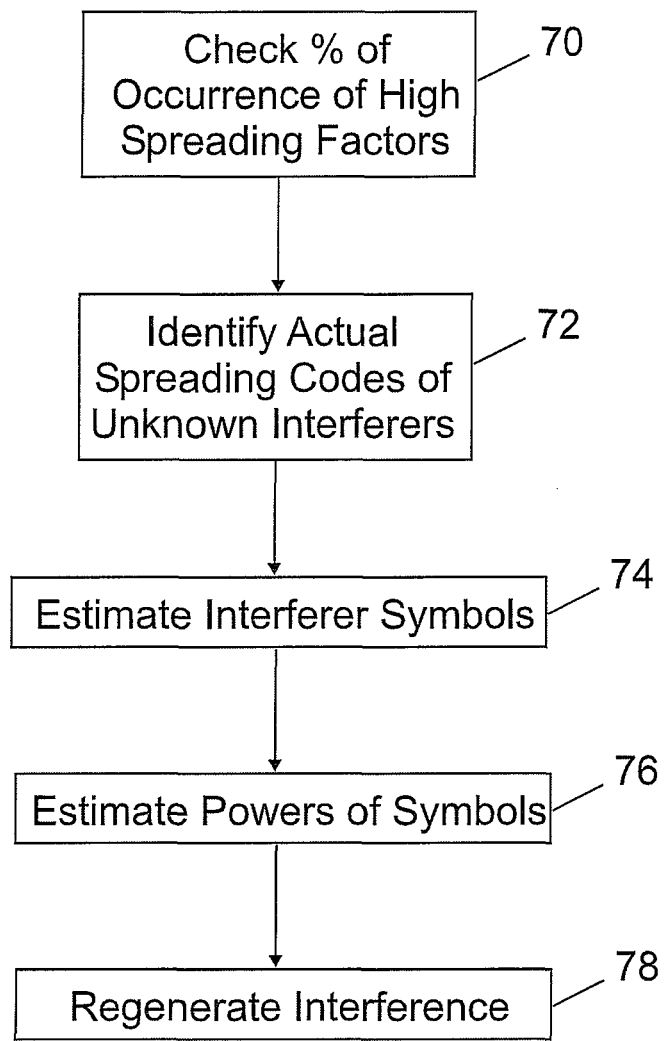
FIG. 5 is a flowchart of a backward phase of an algorithm performed by the detection block and an interferer estimation block in the receiver shown in FIG. 1.

Following these steps, the only remaining codes are those of unknown interferers whose occurrence is not negligible. However, because of the above-mentioned occurrence of virtual codes, each real code of length N will appear at the output of an FWT of length N, 2N, 4N etc., (i.e. a code and its child will appear). Thus, the goal of the backward phase of the algorithm, is to distinguish an "actual" code really used, from virtual (child) codes seen at the outputs of the FWT. Referring to FIG. 5, the first step of the backward phase, involves checking 70 the percentage of occurrence of high spreading factors for the codes remaining after the forward phase. An actual code is one whose percentage of occurrence is around 100%, wherein the percentage of occurrence of each of its child-codes is around 50%. Accordingly, the second step of the backward phase involves identifying 72 the parent spreading codes of the unknown interferers, wherein the identification is performed on the basis of the above-mentioned difference in the rate of occurrence of parent and child spreading codes.

Having identified the spreading codes $s_i$(m) of the known and unknown interferers, the next step is to dispread the original equalised incoming signal r'(m) with the interfering spreading codes, so as to estimate the interferer symbols $\hat{b}_i$(m). More particularly, the estimate $\hat{b}_i$(m) of an interferer symbol at time m is given by $\hat{b}_i(m) = c' Q(m)' r'(m)$, wherein c' is a hermitian conjugate of the spreading code used to transmit the interferer symbol $b_i$(m); and Q(m)' is a hermitian conjugate of a scrambling matrix.

The expectation of $b_i(m)^2$ is equal to the power $P_i$(m) used to scale the symbol before the symbol is transmitted by a base station. More particularly, the power is given by the expression $$P_i(m) = \sum_{i=1}^{M} |\hat{b}_i(m)|^2.$$

In other words, the power is estimated 76 by averaging the square of M estimated symbols. M can be chosen to be very high if a high degree of precision is required. However, this will entail a significant computational cost.

In order to perform Parallel Interference Cancellation (PIC), it is necessary to simulate (or regenerate) 78 the interference signal i(m) (in the originally received incoming signal) using the estimated interferer symbols ($\hat{b}_i$(m)), the known scrambling code, the interfering spreading codes ($s_i$(m)) and the estimated interferer powers ($\hat{P}_i$(m)). The regeneration block 38 regenerates the interference using the expression $H \cdot Q \cdot C_i \cdot P_i \cdot \hat{b}_i$ wherein H is the propagation channel matrix, Q is the scrambling code matrix, $C_i$ is a matrix of the interfering spreading codes, $P_i$ the estimated diagonal power matrix of interferers and $\hat{b}_i$ is the estimated interferer symbol vector. As mentioned above, the reconstructed interference is subtracted from the received signal by the adder block (not shown). If the regenerated interference is subtracted from the received signal (by the adder block (not shown)), only the codes of the user of interest remain. These codes can be detected with a joint detection algorithm. For example, the Wiener receiver is a well-known optimum linear receiver, wherein a received signal (x) can be described by the expression, $x = H \cdot Q \cdot C \cdot b + \text{noise} + \text{interference}$ from other users. In this expression, C is the code matrix of the user of interest, b is the vector of symbols transmitted by the user of interest, the noise term relates to Additive White Gaussian noise (AWGN) and the interference term is that caused by other users.

On removing the interference term with the above-mentioned PIC approach, the signal at the output of the adder block 40 is given by: r(m)=H·Q·C·b+noise. Since all the parameters (H, Q, C and the noise variance) of this expression are known or can be estimated, the Wiener receiver model can be used to estimate the symbols transmitted by the user of interest. More particularly, the estimated symbols $\hat{b}(m)$ are given by $\hat{b}(m)=C'·Q'·H'·(H·Q·C·C'·Q'·H'+noise)^{-1}·r(m)$. The inverted matrix in this expression is the covariance matrix of the incoming signal r(m). Furthermore, C'·Q'·H' is a matrix containing cross correlation vectors between the incoming signal r(m) and the symbols of the user of interest.

Modifications and alterations may be made to the above without departing from the scope of the invention.

The invention claimed is:

1. A method of decoding in a wireless receiver, a wireless transmission from a predefined user to whom more than one user code is allocated, the method comprising:
   receiving a wireless transmission signal (r(m)) in the wireless receiver;
   determining a one or more interfering spreading codes, ($s_i(m)$), contributing to the received wireless transmission signal, (r(m));
   estimating a one or more interferer symbols, ($\hat{b}_i(m)$), from the received wireless transmission signal and the or each interfering spreading codes ($s_i(m)$);
   calculating a one or more scaling factors, ($P_i(m)$), at which the or each of the interferer symbols was originally transmitted;
   simulating an interference signal, i(m), in the received wireless transmission signal (r(m));
   removing the simulated interference signal from the received wireless transmission signal to produce a processed wireless signal, (o(m)); and
   estimating a one or more symbols, $\hat{b}(m)$, transmitted by the predefined user in the processed wireless signal.

2. The method as claimed in claim 1 wherein the determining a one or more interfering spreading codes contributing to the received wireless transmission signal comprises:
   processing the received wireless transmission signal to produce a plurality of orthogonal variable spreading factor spreading codes;
   discarding a one or more orthogonal variable spreading factor spreading codes used by the predefined user from the plurality of orthogonal variable spreading factor spreading codes;
   discarding a one or more known interfering orthogonal variable spreading factor spreading codes from the plurality of orthogonal variable spreading factor spreading codes; and
   discarding a one or more child codes related to the known interfering orthogonal variable spreading factor spreading codes from the plurality of orthogonal variable spreading factor spreading codes.

3. The method as claimed in claim 2 wherein the processing the received wireless transmission signal to produce a plurality of orthogonal variable spreading factor spreading codes comprises processing the received wireless transmission signal with a one or more Fast Walsh Transforms.

4. The method as claimed in claim 1 wherein the estimating a one or more interferer symbols, ($\hat{b}_i(m)$), from the received wireless transmission signal and the or each interfering spreading codes, comprises calculating $\hat{b}_i(m)=c'Q(m)'r'(m)$, wherein c' is a hermitian conjugate of the one or more interfering spreading codes and Q(m)' is a hermitian conjugate of a scrambling matrix.

5. The method as claimed in claim 1 wherein the calculating a one or more scaling factors at which the or each of the interferer symbols was originally transmitted comprises averaging the squared values of the interferer symbols.

6. The method as claimed in claim 1 wherein the simulating an interference signal in the received wireless transmission signal comprises calculating $H·Q·C_i·P_i·\hat{b}_i$, wherein H is a propagation channel matrix, Q is a scrambling code matrix, $C_i$ is a matrix of the interfering spreading codes, $P_i$ a diagonal matrix of the one or more scaling factors and $\hat{b}_i$ is a vector of the interferer symbols.

7. The method as claimed in claim 1 wherein the determining a one or more interfering spreading codes contributing to the received wireless transmission signal is preceded by processing the received wireless transmission signal with a minimum mean squared error equalizer.

8. A wireless transmission decoder, for use in a wireless receiver to decode a wireless transmission from a predefined user in a received wireless transmission signal; the wireless transmission decoder comprising:
   a detection block adapted to determine one or more interfering spreading codes contributing to the received wireless transmission signal;
   an interferer estimation block adapted to estimate a one or more interferer symbols from the received wireless transmission signal and the or each interfering spread codes; and calculate a one or more scaling factors at which the or each of the interferer symbols was originally transmitted;
   a regeneration block adapted to simulate an interference signal in the received wireless transmission signal
   a subtraction means adapted to remove the simulated interference signal from the received wireless transmission signal to produce a processed wireless signal and
   a joint detection algorithm block adapted to estimate a one or more symbols transmitted by the predefined user in the processed wireless signal.

9. The wireless transmission decoder as claimed in claim 8, wherein the detection block comprises:
   a one or more Fast Walsh transform, (FWT), calculating modules adapted to perform a FWT on the received wireless transmission signal; and
   a one or more statistical treatment blocks adapted to calculate the percentage of occurrence of each of a plurality of possible spreading codes in the outputs of the or each FWT calculating modules.

10. A wireless receiver comprising:
   a minimum mean squared error equaliser adapted to invert an effect of a propagation channel on a received wireless transmission signal and thereby produced an equalised incoming signal; and
   a wireless transmission decoder as claimed in claim 8, wherein the wireless transmission decoder is adapted to decode a wireless transmission from a predefined user in the equalised incoming signal.

11. The method as claimed in claim 2 wherein the processing the received wireless transmission signal to produce a plurality of orthogonal variable spreading factor spreading codes comprises processing the received wireless transmission signal with a one or more Fast Walsh Transforms.

12. The method as claimed in claim 2 wherein the estimating a one or more interferer symbols, ($\hat{b}_i(m)$), from the received wireless transmission signal and the or each interfering spreading codes, comprises calculating $\hat{b}_i(m)=c'Q(m)'r'(m)$, wherein c' is a hermitian conjugate of the one or more interfering spreading codes and Q(m)' is a hermitian conjugate of a scrambling matrix.

13. The method as claimed in claim 3 wherein the estimating a one or more interferer symbols, ($\hat{b}_i(m)$), from the received wireless transmission signal and the or each interfering spreading codes, comprises calculating $\hat{b}_i(m) = c'Q(m)'r'(m)$, wherein $c'$ is a hermitian conjugate of the one or more interfering spreading codes and $Q(m)'$ is a hermitian conjugate of a scrambling matrix.

14. The method as claimed in claim 2 wherein the calculating a one or more scaling factors at which the or each of the interferer symbols was originally transmitted comprises averaging the squared values of the interferer symbols.

15. The method as claimed in claim 3 wherein the calculating a one or more scaling factors at which the or each of the interferer symbols was originally transmitted comprises averaging the squared values of the interferer symbols.

16. The method as claimed in claim 4 wherein the calculating a one or more scaling factors at which the or each of the interferer symbols was originally transmitted comprises averaging the squared values of the interferer symbols.

17. The method as claimed in claim 2 wherein the simulating an interference signal in the received wireless transmission signal comprises calculating $H \cdot Q \cdot C_i \cdot P_i \cdot \hat{b}_i$ wherein H is a propagation channel matrix, Q is a scrambling code matrix, $C_i$ is a matrix of the interfering spreading codes, $P_i$ a diagonal matrix of the one or more scaling factors and $\hat{b}_i$ is a vector of the interferer symbols.

18. The method as claimed in claim 3 wherein the simulating an interference signal in the received wireless transmission signal comprises calculating $H \cdot Q \cdot C_i \cdot P_i \cdot \hat{b}_i$ wherein H is a propagation channel matrix, Q is a scrambling code matrix, $C_i$ is a matrix of the interfering spreading codes, $P_i$ a diagonal matrix of the one or more scaling factors and $\hat{b}_i$ is a vector of the interferer symbols.

19. The method as claimed in claim 2 wherein the determining a one or more interfering spreading codes contributing to the received wireless transmission signal is preceded by processing the received wireless transmission signal with a minimum mean squared error equalizer.

20. The method as claimed in claim 3 wherein the determining a one or more interfering spreading codes contributing to the received wireless transmission signal is preceded by processing the received wireless transmission signal with a minimum mean squared error equalizer.

* * * * *